United States Patent Office 3,326,716
Patented June 20, 1967

3,326,716
GLASS FIBER BINDER
Elmer B. Hurley, Martinsville, N.J., and Ellsworth L. Smith, Maumee, and Walter Kitaj, Toledo, Ohio, assignors to Johns-Manville Corporation, New York, N.Y., a corporation of New York
No Drawing. Filed Aug. 30, 1963, Ser. No. 305,874
16 Claims. (Cl. 117—126)

This application is a continuation-in-part of United States patent application Ser. No. 79,124, filed Dec. 29, 1960, and now abandoned, and of application Ser. No. 159,424, filed Dec. 14, 1961, and now abandoned.

This invention relates to a new composition of matter. More particularly, the invention relates to a new composition of matter especially adapted for the treatment of fibrous glass materials which find utility in combination with resinous materials. This invention further relates to the manufacture of glass fiber-reinforced plastic articles wherein the glass fibers are treated with a new composition of matter which not only improves the preliminary processing characteristics of the glass fibers in strand, roving and fabric manufacture, but, likewise, enhances the reinforcing characteristics of the glass fibers when incorporated in resinous compositions. This invention also relates to the improvement of the resinous composition per se to enhance the chemical and physical properties thereof in glass fiber-reinforced plastic articles, particularly those made from epoxy resins.

HISTORY

Glass fibers have now become well-recognized by experimentation and usage as possessing exceptional strength and flexibility properties. Coupled with the relative inertness and good resistance to temperature and chemical attack, these characteristics have made glass fibers commercially a most desirable material, to the extent of almost becoming indispensable in the production of structural materials, reinforced plastics, and other laminate materials. The most important commerical products are those composed of glass fibers and thermosetting resins such as polyesters and epoxy resins.

However, the industry has been somewhat plagued by the difficulty or inability to make full utilization of the exceptional strength characteristics of the fibers when combined with resinous materials. This difficulty has been particularly evident when the thermosetting resin selected consists primarily of epoxy resins.

The most prominently advanced theory regarding this disadvantage has attributed the limitation to the non-realization of a truly satisfactory adhesion of the resinous material to the fiber surface. One of the principal reasons for this poor adhesion has been the insufficiency of the most conventional thermosetting resins to fully wet a glass surface. Thus, the intimate contact desired is not always obtained.

The problem of adhesion is further complicated by the fact that the glass surface per se is so smooth as to hinder the establishment of a suitable bond of the resinous material by physical means. Accordingly, even as the above-mentioned problem of wettability is overcome and the fiber becomes completely wet by the resin, there remains the fact that the resin and fiber could easily be separated under low stresses. The relative strength of the resultant article can consequently be quite low.

Moreover, the physical nature of the glass fiber being somewhat hydrophilic, in addition to the above-mentioned organophobicity, coupled with the fact that the resinous materials with which the fibers are generally combined usually have an affinity to water, have caused the glass fiber-reinforced plastic industry much additional concern. Any bond which would result is markedly reduced under high humidity conditions by the formation of a water film upon the surface of the glass which undesirably replaces the resinous material. Accordingly, the strength characteristics are, likewise, reduced. Since most of the applications of glass fiber-reinforced plastic involve subjecting the plastic material to highly humid atmospheric conditions, or in fact in several situations in direct contact with water, the reduction of this hydrophilic capacity to a minimum has become of major concern within the industry. Thus, the industry has continually sought ways to improve wet strength retention.

A still further factor contributing to the poor adhesion between the resin and the fibrous glass material has been the incompatability of several resinous adhesion-promoting materials with the sizing material. Early in glass fiber history it had become evident because of the inter se abrasion and friction of the fibers that it would be necessary to apply a size composition immediately upon formation. A function of such a size, in addition to lessening the above-mentioned undesired properties by imparting lubrication to the fibers is to aid in subsequent weaving. The size composition is applied to the glass fiber strand immediately upon formation at the bushing by subjecting the strand, prior to winding it upon the attenuating roll, against a pad which is continually saturated with the size liquid. The fibers pick up this size fluid as they pass over the pads. In addition to imparting lubrication to the fibers and thus preventing breakage during subsequent twisting and winding operations, the composition must also contain adhesive ingredients for binding the individual filaments into a unitary strand. The strand must function as a single fiber during subsequent processing; hence, if not properly bound, it will tend to separate into many small filaments and will hamper the additional manufacturing steps. Still further, some of the constituents of the size material, by their presence, inhibit proper curing of the subsequently applied adhesives, producing a bonding of the resin to the fiber, thereby reducing the total effectiveness of both the size and the bonding agent.

The industry has, therefore, spent a great deal of time and effort on a variety of programs seeking a solution for these many problems.

Adhesion of substantially good characteristics has been developed as a result of these programs. The underlying principle involved is the treatment of the glass fiber with a chemical composition which can be termed a "coupling agent." The effect of the chemical composition is, as the term literally reads, to couple or bond the resin to the glass fiber. The properties of the coupling agent are those which would necessarily reduce the hydrophilic nature of the glass fiber to a minimum while promoting an organophilic property in its stead. Of course, the materials so chosen must be of such a nature as not to affect deleteriously the glass fiber or otherwise weaken the system.

In the early development of such coupling agents, the primary effort was based on the establishment of a physical bond between the fiber and resin composition. However, after several attempts utilizing such a theory, it was concluded that this would be unsatisfactory and that a chemical bond would more adequately insure the relationship between the two components. The early theory advanced in this regard was that the composition should be compatible with the size compositions, and thereby it could be applied to the glass fiber simultaneously with the size composition. This proved to be feasible but only in those situations where a non-starch type of size was used, e.g., polyvinyl acetate.

One of the earliest accepted coupling agents involves the application of a Werner type complex having a nuclear chromium atom coordinated with an acido group containing 2 to 8 carbon atoms and formed with a highly functional unsaturated ethylenic linkage. Such materials have been used in conjunction with polymers containing ethylenic unsaturation. The materials are illustrated in U.S. Patent No. 2,552,910 and are represented by the compound methacrylato chromic chloride.

Elsewhere an attempt was made to provide a different type of bonding agent by the use of unsaturated organosilicon compounds. U.S. Patent No. 2,563,288 directed to allyl silane compositions is illustrative of such coupling agents. Additional work along this latter line determined that a more beneficial coupling agent could be achieved if the unsaturated organo group was limited to vinyl. U.S. Patents Nos. 2,668,006 and 2,668,007 evidence such determinations.

The generally accepted theory underlying all of the above bonding procedures is the selection of a material able to wet substantially the glass surface and become attached or adhered to the hydroxyl groupings upon the glass surface through the trivalent chromium complex or the organo silane compound. The selection of an unsaturated carbon chain as the organo group provides an additional mechanism, to permit subsequent coaction in the form of polymerization with the later applied resinous material. Thus, a complete chemical linkage is effected.

Many modifications of these basic principles have been attempted; included among these have been the substitution in the organo radical of such groups as the hydroxy and amino radicals in order to further promote polymerization with various condensation products.

Although the two above-mentioned classes of chemical coupling agents at present constitute substantially all the coupling materials and have produced rather satisfactory results in most instances, there, nevertheless, remain several deficiencies in respect to each agent which have evidenced that there is a strong need for a more effective coupling agent. For example, the wet strength characteristics of the silane-treated material being somewhat less desirable than those of the chrome complex-treated material have made the former unapplicable in many situations. On the other hand, poor weavability of a chromium-treated fiber has greatly restricted its use. Thus, in the latter situation, if the glass fiber is to be woven prior to its incorporation into a plastic composition as a reinforcement or the like, compositions different from the chrome complex coupling compositions must be used initially as the size required to impart to the fiber strands the properties necessary for the successful weaving of the fabric. It then becomes necessary, upon completion of the weaving of such a fabric, to remove the size composition, as by washing or burning, then treat the fibers with the desired anchoring agent. Such additional steps obviously materially add to the cost of the resultant article. Still further, the incompatibility of the particular coupling agents with various types of thermosetting resins has proved to be a limiting factor on the versatility of the treated fibers. Moreover, it has been a constant desire of the industry to improve the strength characteristics of glass fiber reinforced plastic material under both wet and dry conditions.

OBJECTS

It is, therefore, a principal object of this invention to provide a new composition of matter which may be used in conjunction with glass fibers to overcome the above disadvantages.

It is another object of this invention to provide a new composition of matter capable of imparting heretofore unobtainable bonding characteristics to glass fibers.

It is still another object of this invention to provide a new chemical composition of matter which is capable of imparting the above-mentioned new bonding characteristics to glass fibers and which may be used as a glass fiber size composition.

It is another object of this invention to provide a coating or size composition for glass fibers which will not only act as a size composition but which will also properly provide the fibers with exceptional bonding characteristics for ultimate use in plastic laminates.

It is a further object of this invention to provide a new size composition for glass fibers which will overcome the above-mentioned difficulties, and which not only possesses proper size characteristics, facilitating subsequent weaving of glass fiber treated therewith, but also ultimately provides a coupling mechanism on the glass fiber to increase the strength characteristics of a plastic article reinforced with the treated glass fiber.

It is still another object of this invention to provide a new composition of matter which, while imparting beneficial size characteristics to glass fibers and additionally imparting weavability to the glass fibers, eliminates both the necessity of burning off of the size and subsequent recoating of the fiber to impart adhesion-promoting characteristics thereto.

It is a further object of this invention to provide a new coating composition for glass fibers that facilitates the production of glass fibers and enhances the fabrication of yarns into woven fabric wherein the yarn and woven fabrics are characterized by new and improved properties such as handleability and high strength.

Another object of this invention is to provide a glass fiber treating composition capable of improving the strength characteristics of epoxy resin containing articles reinforced with such glass fibers.

It is yet another object of this invention to provide a process of preparing the above new composition of matter capable of imparting the stated characteristics to glass fibers.

It is a further object to provide coated or sized glass fibers having good handleability and capable of being woven or the like into glass fabrics.

It is another object of this invention to provide coated or sized glass fibers capable of incorporation in resinous materials so as to characterize the ultimate product by improved strength properties.

It is still a further object of this invention to provide a coated glass fiber which is capable of imparting good physical properties, as a reinforcement, to all types of thermosetting resins, preferably, epoxy resins.

Another object of this invention is to provide a glass fiber-reinforced plastic material characterized by heretofore unobtainable high strength characteristics.

It is a specific object of this invention to provide sized or coated glass fibers to be used in conjunction with epoxy resins to produce composite glass fiber-reinforced plastic which will satisfy all present specifications.

BRIEF DESCRIPTION OF THE INVENTION

It has been discovered that these objects and others, which may hereinafter appear, may be satisfied and the above-mentioned disadvantages overcome by subjecting the reinforcing fibers, e.g., glass fibers, to a coating composition comprising a novel coupling agent comprising (1) a water-soluble carboxyl substituted phenol and (2) a water-soluble polyvalent metal salt which is the salt of a weak base and a strong inorganic acid.

By water-soluble is meant a material which is soluble to the extent of at least 0.1% in water. (Unless otherwise indicated, all parts and percentages are by weight).

While not being limited to any theory of action, it is believed that the phenol compound and the metal salt react to form a salt or complex.

Examples of suitable phenols include salicylic acid, m-hydroxybenzoic acid, p-hydroxybenzoic acid, α-resorcylic acid, β-resorcylic acid, protocatechuic acid, 2-hydroxy 3-naphthoic acid, hydroxy anthracene-carboxylic acid. The preferred phenols are hydroxybenzoic acids.

The water-soluble polyvalent metal salt can be the salt of a metal of group Ib, e.g., cupric chloride, cupric sulfate, cupric nitrate, group IVb, e.g., titanium tetrachloride, titanium tetrabromide, zirconium tetrachloride, group Vb, e.g., vanadium pentachloride, vanadium trichloride, vanadium sulfate, tantalum pentachloride, group VIb, e.g., chromic chloride, chromic sulfate, chromic bromide, tungstic chloride, group VIIb, e.g., manganous chloride, manganous sulfate, manganous bromide, group VIIIb, e.g., ferric sulfate, ferrous chloride, ferric nitrate, cobaltic chloride, cobaltous chloride, cobaltic bromide, nickelous chloride, nickelous sulfate, nickelic chloride, nickelic bromide, groups IIb, e.g., zinc chloride, zinc bromide, group IIIa, e.g., aluminum chloride, aluminum bromide, aluminum iodide, aluminum sulfate, aluminum nitrate, group IVa, e.g., stannous chloride, stannic chloride, stannous bromide, group Va, e.g., bismuth chloride, rare earth metal salts, e.g., cerium chloride, lanthanum chloride, cerium bromide and uranyl sulfate.

It is important that the pH of the treating solution be on the acid side since many of the materials employed precipitate in an alkaline medium. The pH is usually maintained between 2.5 and 7, and preferably between 4.0 or 4.5 and 6.5.

The composition is best applied from an aqueous medium. This is particularly advantageous from a safety standpoint and especially significant wherein the composition is to function as a size because of the extremely high ambient temperatures associated with normal sizing operations. However, where conditions are such as to remove this hazard, such as in a fabric finishing operation, it is quite possible that, if desired, an organic solvent system can be used.

If the compounds are applied in conjunction with a size composition, the composition can comprise one or more film-forming thermoplastic resins and preferably a cationic lubricating agent, all of which are particularly described hereinafter.

DETAILED DESCRIPTION OF THE INVENTION

A more complete understanding of the invention may be obtained by reference to the following examples and description of operations within the scope of this invention. In the examples all parts and percentages are by weight unless otherwise indicated.

Example 1

A 140-gallon tank was filled with water to the top of the steam jacket. Thirty-five pounds of Flexbond 800, a polyvinyl acetate, were added. Twelve pounds of K-90, a polyvinylpyrrolidone, were mixed with cold water and added to the batch. Six pounds AHCO-185A, an anhydrous acid solubilized low molecular weight fatty acid amide of pelargonic acid and tetraethylene pentamine, were mixed in hot water and added slowly to the batch. In another 140-gallon tank, fifteen gallons of water were heated to a boil. Two pounds of salicylic acid were added and the mixture was allowed to boil until the acid dissolved. The acid was then added to the batch mixture. Approximately three pounds of ferric chloride were then added to the batch.

The above composition was combined with water to produce a composition characterized by the following percentages by weight, after which the pH was adjusted to 3.2 with hydrochloric acid.

|  | Percent |
|---|---|
| Polyvinyl acetate | 3.0 |
| Polyvinylpyrrolidone | 1.0 |
| Fatty acid amide | 0.5 |
| Formic acid | 0.1 |
| Salicylic acid | 0.2 |
| Ferric chloride | 0.3 |

The above size composition was applied to continuous filament glass strands as the strands were drawn from a bushing. Application was made at the point of gathering the filaments, by means of a continuously saturated pad. The binder pickup on the glass fibers was approximately 1%. The resulting glass fiber, when coupled with a resinous material, gave good ultimate strength characteristics, as well as good wet-strength retention, as will be illustrated hereinafter.

A second aspect of this invention involves a discovery that additional strength characteristics may be obtained if an organo silane, such as vinyl triethoxy silane was mixed with the resinous material prior to its use with glass fibers. Thus, there can be used the unsaturated silanes having the formula $$R_1SiX_{4-n}$$

where $R_1$ is

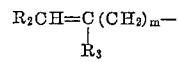

or lower alkylamino or lower alkoxyglycidyl where $R_2$ and $R_3$ are selected from the group consisting of hydrogen, halogen, alkyl and aryl radicals, X is a radical of the group consisting of halogen, alkoxy, and aryloxy, $n$ is an integer between 1 and 3 and $m$ is an integer from 0 to 1. Typical materials within the group are allyl triethoxy silane, diallyl diethoxy silane, triallyl ethoxy silane, methallyl trichloro silane, bis(1-phenyl vinyl) dichlorosilane, diallyl dichlorosilane, dimethallyl diethoxy silane, allyl trichloro silane, vinyl trichoro silane, divinyl dimethoxy silane, crotyl allyl diethoxy silane, 1-chloro vinyl triethoxy silane, 2-chlorovinyl tripropoxy silane, vinyl triphenoxy silane, styryl triethoxy silane, tri-($\beta$-chloroallyl)chloro silane, diallyl methyl ethoxy silane, gamma amino propyl triethoxy silane (available commercially as A-1100 from Union Carbide Corp. and having the formula $(C_2H_5O)_3SiCH_2CH_2CH_2NH_2$) and an epoxy silane such as trimethoxy glycidyloxymethyl silane having the formula

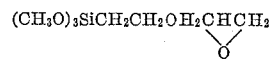

(available commercially as Y-4087 from Union Carbide Corp. or as Z-6040 from Dow Chemical Company). There can be employed other trialkoxy aminoalkyl silanes, e.g., beta aminoethyl, trimethoxy silane and delta aminopropyl methoxy diethoxy silane. There can be more than one lower alkyl amino or lower alkyloxyalkylene oxide group. Thus, there can be used diethoxy di(aminopropyl) silane and diethoxy di(glycidyl oxypropyl) silane.

The resulting products of this method are characterized by improved strength characteristics, which, in almost every instance, are better than heretofore obtainable.

The following discussion illustrates the respective wet and dry strength of laminates prepared according to prior art methods, i.e., those prepared by using previously known coupling agents, and those of the laminates prepared according to the instant invention. The conditions used in preparing the laminates were identical in each situation. The data is set forth in Table I below.

After the laminate had been cured, it was cut up into flexural, tensile and compression samples—six each. These samples were machined to Government specifications and numbered from one to six. They were then separated for dry and wet tests, using the odd numbers for the dry tests and the even numbers for the wet tests. The dry samples were tested and the results recorded and averaged. The wet samples were given a two-hour boil in distilled water, which is the equivalent of thirty days' immersion in water, and tested while still wet. Results were recorded and averaged. The average dry strength divided into the average wet strength gives the percent retention. One broken flexural sample was selected from each laminate for ignition loss tests. The sample was cut ½ inch on either side of the break, giving a 1 inch square sample. The sample was weighed, burned off at 1000° F., weighed again and the percent resin calculated. All tests were run according to Government Specification LP-406b.

The compositions of the instant invention are referred to hereinafter by the phrase "Universal Binder."

TABLE I

| Treatment | Flexural | | | Tensile | | | Compression | | | Wet time in min. | Percent resin |
|---|---|---|---|---|---|---|---|---|---|---|---|
| | Dry | Wet | Percent ret. | Dry | Wet | Percent ret. | Dry | Wet | Percent ret. | | |
| EPON-820+20% Z | | | | | | | | | | | |
| Garan | 69,677 | 59,780 | 85.8 | 51,853 | 46,825 | 90.3 | 52,690 | 45,090 | 45.6 | 120+H | 39.7 |
| Universal Binder | 73,417 | 60,963 | 83.0 | 60,838 | 59,672 | 98.1 | 62,239 | 41,452 | 66.6 | 60+H | 39.3 |
| Universal Binder + Silane in resin | 80,271 | 70,825 | 88.2 | 60,058 | 57,919 | 96.4 | 60,765 | 52,070 | 85.7 | 60+H | 39.3 |
| Starch | 59,393 | 51,206 | 86.2 | 44,641 | 46,051 | 100+ | 38,442 | 29,295 | 76.2 | 120+H | 39.1 |
| Volan | 68,846 | 67,914 | 98.6 | 49,590 | 49,087 | 99.0 | 52,288 | 50,755 | 97.1 | 60+H | 38.7 |
| EPON-815+20% Z | | | | | | | | | | | |
| Garan | 67,495 | 57,322 | 84.9 | 55,505 | 53,618 | 96.6 | 52,189 | 40,313 | 77.2 | 60+H | 40.2 |
| Universal Binder | 77,866 | 58,813 | 75.5 | 59,019 | 58,713 | 99.4 | 55,980 | 37,413 | 66.8 | 60+H | 37.6 |
| Universal-Binder + Silane in resin | 79,957 | 70,895 | 88.7 | 60,377 | 58,200 | 96.4 | 57,442 | 47,753 | 83.1 | 60 | 36.6 |
| Starch | 70,751 | 45,935 | 64.9 | 56,734 | 54,770 | 96.5 | 49,927 | 25,719 | 51.5 | 60+H | 37.5 |
| Volan | 67,669 | 61,606 | 91.0 | 50,123 | 50,188 | 100 | 51,200 | 44,006 | 85.9 | 30+H | 38.1 |
| 1½% Garan over Universal Binder | 60,281 | 58,064 | 96.3 | 58,527 | 59,998 | 85.4 | 56,360 | 38,271 | 82.6 | 60+H | 34.6 |
| ½% Garan over Universal Binder | 70,583 | 67,337 | 95.4 | 58,424 | 54,096 | 92.6 | 52,133 | 45,504 | 89.2 | 90+H | 37.6 |
| ¼% Garan over Universal Binder | 73,622 | 66,694 | 90.6 | 59,293 | 56,058 | 94.5 | 52,228 | 48,785 | 93.4 | 60 | 35.9 |
| EPON-828+20% Z | | | | | | | | | | | |
| Garan | 68,676 | 59,842 | 87.1 | 47,382 | 46,602 | 98.4 | 51,198 | 41,861 | 81.8 | 180+H | 39.9 |
| Universal Binder | 77,172 | 58,529 | 75.8 | 56,400 | 54,453 | 96.5 | 61,333 | 40,193 | 65.5 | 30+H | 38.8 |
| Universal Binder + Silane in resin | 75,724 | 69,835 | 92.2 | 58,332 | 55,123 | 94.5 | 60,316 | 47,850 | 79.3 | 30+H | 38.4 |
| Starch | 59,049 | 41,823 | 70.8 | 48,156 | 45,005 | 93.5 | 39,113 | 20,206 | 51.6 | 60+H | 38.5 |
| Volan | 68,191 | 61,116 | 89.6 | 51,213 | 48,075 | 93.9 | 54,824 | 50,020 | 91.2 | 60+H | 39.9 |
| EPI-REZ-510+20% Z | | | | | | | | | | | |
| Garan | 59,147 | 58,682 | 99.2 | 48,467 | 48,460 | 99.98 | 49,248 | 46,516 | 94.5 | 60+H | 40.8 |
| Universal Binder | 75,856 | 61,462 | 81.0 | 58,512 | 56,238 | 96.1 | 54,974 | 41,520 | 75.5 | 45+H | 37.7 |
| Universal Binder + Silane in resin | 72,257 | 67,296 | 93.1 | 59,127 | 55,805 | 97.7 | 59,513 | 49,613 | 83.4 | 45+H | 38.0 |
| Starch | 66,033 | 49,605 | 75.1 | 54,167 | 52,893 | 97.6 | 43,748 | 24,678 | 56.4 | 45+H | 38.2 |
| Volan | 68,269 | 65,540 | 96.0 | 54,037 | 51,463 | 95.2 | 57,780 | 54,710 | 94.7 | 60+H | 37.7 |
| EPI-REZ-504+20% Z | | | | | | | | | | | |
| Garan | 61,720 | 59,930 | 97.1 | 56,366 | 53,092 | 94.2 | 47,533 | 41,835 | 88.0 | 10 | 38.7 |
| Universal Binder | 70,267 | 55,154 | 78.5 | 62,366 | 57,345 | 91.9 | 58,800 | 28,530 | 48.5 | 0 | 37.0 |
| Universal Binder + Silane in resin | 67,759 | 67,485 | 99.6 | 59,750 | 56,855 | 95.2 | 57,733 | 47,466 | 82.2 | 0 | 38.4 |
| Starch | 69,920 | 51,195 | 73.2 | 59,166 | 56,095 | 94.8 | 47,600 | 23,858 | 50.1 | 10 | 37.0 |
| Volan | 64,193 | 56,921 | 88.7 | 52,552 | 50,481 | 96.1 | 48,874 | 41,080 | 84.1 | 15 | 36.7 |

In all the tables the compositions are identified as follows:

All of the Epi-Rez and Epon resins were liquid bisphenol A-epichlorhydrin resin. They had the following properties:

| Resin | Epoxide Equivalent | Aver. Mol. Wt. | Viscosity (cps.) |
|---|---|---|---|
| Epon-815 | 175-210 | 340-400 | 500-900 |
| Epon-820 | 175-210 | 350-400 | 4,000-10,000 |
| Epon-828 | 175-210 | 350-400 | 5,000-15,000 |
| Epi-Rez-510 | 180-200 | 350-400 | 9,000-18,000 |
| Epi-Rez-504 | 170-180 | 350-400 | 150-210 |

Agent Z is a m-phenylene diamine curing agent for epoxy resins sold by Shell Chemical Corporation.

Garan is a commercial glass fiber size composition and for purposes of these data contained 125 parts by volume of a 20% solution in water of hydrolyzed vinyl triethoxy silane, 50 parts by volume of a 50% emulsion polymer of polyvinyl acetate (Swift's Glu-bond being used as emulsifier agent), and 825 parts by volume of water, and was applied to the glass fibers during the glass fiber drawing and forming operation.

Volan is another commercial glass fiber size composed of polyvinyl acetate emulsion (Swift Adhesive No. 1482), a cationic softening agent (Arnold-Hoffman RL-185), and methacrylato chromic chloride complex.

The designations of Universal Binder plus silane are applied to those laminates wherein a silane has been added to the resin.

Additional tests were run to reaffirm the above data. The same procedure was used.

In almost every case the Universal Binder with 1½% silane added to the laminating resin showed higher ultimate strengths than any of the other finishes or binders tested.

For the purposes of drawing a conclusion, the following figures are presented. These are overall average figures—resin against resin, finish against finish, in order, from highest to lowest. The average strength is that of compression, flexural and tensile.

TABLE II

*Finishes*

Average dry strength
Universal binder+silane _____ 64,625
Universal binder _____ 64,496
Garan _____ 55,943
Starch _____ 53,789

Average wet strength
Universal binder+silane _____ 58,333
Universal binder _____ 51,363
Garan _____ 50,651
Starch _____ 41,222

*Finishes—Continued*

|  | Average percent retention |
|---|---|
| Garan | 90.7 |
| Universal binder+silane | 90.4 |
| Universal binder | 83.8 |
| Starch | 75.9 |

*Resins*

|  | Average dry strength |
|---|---|
| Epon-815 | 62,170 |
| Epi-Rez-504 | 60,350 |
| Epon-820 | 60,065 |
| Epon-828 | 59,311 |
| Epi-Rez-510 | 58,905 |

|  | Average wet strength |
|---|---|
| Epon-828 | 59,924 |
| Epon-820 | 53,245 |
| Epon-815 | 52,112 |
| Epi-Rez-510 | 52,025 |
| Epi-Rez-504 | 51,459 |

|  | Average percent retention |
|---|---|
| Epon-820 | 86.6 |
| Epi-Rez-510 | 88.3 |
| Epi-Rez-504 | 85.3 |
| Epon-828 | 84.2 |
| Epon-815 | 83.8 |

Still further evaluation of the Universal Binder and the resins used was conducted.

Epon-820 with 1½% silane added showed higher ultimate strengths than any of the other resins. It was slightly below Epi-Rez-510 with 1½ silane in percent retention, but the difference is in the margin of experimental error.

P-43 and P-42 are polyester resins sold under the trademark "Paraplex" by Rohm and Haas Co. Paraplex P-43 is a condensation product comprising propylene glycol and dipropylene glycol in the ratio of 1 to 3 parts with phthalic anhydride and maleic anhydride in the ratio of 3 to 2. These resins plus 1½% silane, vinyl triethoxy silane, were tested for flexural strength only, so they are not rated with the other resins. Their flexural strengths and percent retention are listed separately. It is indicated that silane added to the resin increases the strength of the laminate over the resin alone. It is also indicated that the lower viscosity resins produce a weaker laminate. The flexural wet and dry strengths of the polyester resin were determined and are listed below in Table III.

TABLE III

|  | Dry | Wet | Percent Retention |
|---|---|---|---|
| P-43+2% Luperco | 53,600 | 45,600 | 76.6 |
| P-43+2% Luperco+1¼% Silane | 54,200 | 51,100 | 94.4 |

Luperco is benzoyl peroxide. Unless otherwise indicated, the term "silane" as used in the specification is vinyl triethoxy silane. Flexural, tensile and compression in the specification are measured in pounds per square inch.

Further tests were conducted to determine the effects of the instant composition when used in conjunction with polyester resin laminates. The polyester laminates were prepared by the same method as described for the epoxy resins, however, eliminating the particular curing procedure for the epoxy resins and substituting therefor that of the polyester. The data for these particular laminates are recorded below in Table IV, in which table the polyester was Paraplex P-43.

TABLE IV.—POLYESTER RESIN LAMINATES—UNIVERSAL BINDER SIZING—181 CLOTH

| Sample Number | Dimension, Inches | Area in Square Inch | Load in Pounds | Tensile Strength, p.s.i. |
|---|---|---|---|---|
| TENSILE TEST (WARP) | | | | |
| 1 | .112 x .495 | 0.0554 | 2,440 | 44,050 |
| 2 | .112 x .495 | 0.0554 | 2,380 | 42,960 |
| 3 | .110 x .489 | 0.0538 | 2,440 | 45,350 |

EDGE COMPRESSION TEST (WARP)

| Width, Inches | Thickness, Inches | Height, Inches | Area, Square Inch | Load in Pounds | p.s.i. |
|---|---|---|---|---|---|
| .498 | .091 | 2.992 | .0453 | 2,280 | 50,330 |
| .500 | .090 | 3.004 | .045 | 2,300 | 51,110 |
| .500 | .089 | 2.998 | .0445 | 2,520 | 56,630 |
| .496 | .093 | 3.000 | .0461 | 2,700 | 58,568 |
| .496 | .090 | 2.998 | .0446 | 2,620 | 58,744 |

TENSILE TEST (FILL)

| Panel Number | Dimension, Inches | Area in Square Inch | Load in Pounds | Tensile Strength, p.s.i. |
|---|---|---|---|---|
| 1 | .089 x .485 | 0.0432 | 2,120 | 49,074 |
| 2 | .109 x .492 | 0.0536 | 2,180 | 40,671 |
| 3 | .113 x .496 | 0.056 | 1,940 | 34,642 |
| 4 | .112 x .495 | 0.0554 | 2,160 | 38,989 |

EDGE COMPRESSION TEST (FILL)

| Width, Inches | Thickness, Inches | Height, Inches | Area, Square Inch | Load in Pounds | p.s.i. |
|---|---|---|---|---|---|
| .492 | .089 | 3.007 | .0438 | 1,900 | 43,378 |
| .499 | .094 | 2.987 | .0469 | 2,740 | 58,422 |
| .499 | .091 | 2.998 | .0454 | 2,620 | 57,709 |
| .499 | .095 | 3.004 | .0474 | 2,800 | 59,071 |
| .499 | .090 | 2.996 | .0449 | 2,720 | 60,579 |

TABLE V.—PHYSICAL TESTS

|  | Flexural | | | Tensile | | | Compression | | |
|---|---|---|---|---|---|---|---|---|---|
|  | Dry | Wet | Percent ret. | Dry | Wet | Percent ret. | Dry | Wet | Percent ret. |
| UNIVERSAL BINDER WOVEN ROVING LAMINATES | | | | | | | | | |
| Epoxy 828, no additive | 77,860 | 66,850 | 85.9 | 62,765 | 50,650 | 80.7 | 60,925 | 45,885 | 75.3 |
| Epoxy 828, 1.5% VTES | 78,840 | 77,906 | 98.8 | 60,810 | 53,183 | 88.5 | 58,000 | 48,730 | 84.0 |
| Polyester Resin P-43, no additive | 55,600 | 26,020 | 46.8 | 59,630 | 48,890 | 82.0 | 30,075 | 9,807 | 32.6 |
| Polyester Resin P-43+1% VTES, no additive | 68,800 | 57,790 | 84.0 | 65,300 | 57,635 | 88.3 | 42,700 | 31,550 | 73.9 |
| UNIVERSAL BINDER—181 FABRIC | | | | | | | | | |
| Epoxy 828, no additive | 64,460 | 53,320 | 82.7 | 48,000 | 45,654 | 95.1 | 48,920 | 36,536 | 74.7 |
| Epoxy 828, 1.5% VTES | 71,840 | 63,500 | 88.4 | 52,490 | 51,138 | 97.4 | 57,480 | 47,404 | 82.5 |
| Polyester Resin P-43, no additive | 50,020 | 34,320 | 68.6 | 55,190 | 41,206 | 74.7 | 34,584 | 13,534 | 39.1 |
| Polyester Resin P-43+1.5% VTES | 52,890 | 49,834 | 94.2 | 60,145 | 56,100 | 93.3 | 38,455 | 30,130 | 76.0 |
| Military Specs. R-7575 | 50,000 | 45,000 | ---- | 40,000 | 38,000 | ---- | 35,000 | 30,000 | ---- |

Additional data were collected to compare the various physical strengths of both epoxy and polyester resin laminates, both with and without the addition of vinyl triethoxy silane in the resin composition. The data were compared with the military specification minimum for their respective strengths. The results of such computations are listed above in Table V.

The preceding physical data indicate the advantages derived from the addition of 1.5% vinyl triethoxy silane (VTES) to both the epoxy and polyester resin when making laminates with Universal Binder sized roving or fabric. The addition increases both the ultimate strength and the wet strength retention.

In order to completely evaluate the scope of the instant invention, it was decided that various binders based on the standard compositions similar to that of Example 1 should be made. The components, the percentage relationships, the salt constituent, as well as the acid constituent, were varied. Moreover, various operating conditions were also altered to determine their effect. In each case the binders were used to make ECG 140 1/0 0.0 glass yarn which was converted into roving. The rovings were used to make NOL rings which were tested on the Instron tester. The physical data resulting from these tests were used to evaluate the individual binder ends shown below in Table VI.

Example 2

The preparation of a standard binder formulation was undertaken in accordance with the procedure disclosed above in Example 1 to produce a composition having the following percentages by weight:

|  | Percent |
|---|---|
| Polyvinyl acetate | 3.58 |
| Polyvinylpyrrolidone | 1.19 |
| Fatty acid amide | 0.58 |
| Salicyclic acid | 0.24 |
| Ferric chloride | 0.35 |
| Water, to | 100 |

The composition of Example 2 was used as the standard for comparing the various other compositions.

Example 3

In this particular example the amount of the ferric chloride and salicyclic acid were reduced to 0.18% and 0.12%, respectively.

Example 4

In this example the amount of the ferric chloride and salicyclic acid was increased to 0.53% and 0.36%, respectively.

Example 5

The amount of ferric chloride was reduced to 0.10%; the other ingredients were present in the standard amount.

Examples 6 and 7

In these two examples the amount of ferric chloride was changed to 0.20% and 0.50%, respectively. The other ingredients again remain constant with the standard.

Example 8

In this particular experiment the salicyclic acid was substituted by a para-hydroxybenzoic acid using the same percentage.

Example 9

The ferric chloride in the standard composition (Example 2) was replaced by an equal weight of ferric sulfate.

Example 10

The ferric chloride in the standard composition was replaced by an equal weight of ferrous sulfate.

Example 11

The ferric chloride in the standard composition was replaced by an equal weight of ferrous bromide.

Example 12

The ferric chloride in the standard composition was replaced by an equal weight of cobaltous chloride.

Example 13

The ferric chloride in the standard composition was replaced by an equal weight of nickelous chloride.

Example 14

The ferric chloride in the standard composition was replaced by an equal weight of aluminum chloride.

Example 15

The ferric chloride in the standard composition was replaced by an equal weight of chromic chloride.

Examples 16–18

In each of these examples the effect of the pH of the binder composition on the properties of the glass was determined by fixing the final pH of the composition at 2.5, 5.0 and 6.5, respectively, by the use of a drop or two of hydrochloric acid or sodium hydroxide. The standard composition of Example 2 had a pH of 4.0.

The results of testing NOL rings made from the ECG 140 roving using the above-described binder systems were tested using Epon–828 epoxy resin containing 20% Z hardener. The procedure used to make the NOL rings was as follows: The treated glass fiber was used to make approximately sixteen forming cakes. In some instances, due to poor manufacturing conditions, only eight to ten were produced. These cakes were then dried at 235° F. for five hours. The dried material was used to make twelve-end roving packages of approximately seven pounds each. The roving material was then given a two-hour afterbake at 235° F. Using a lathe, the rovings were wound on a 4-inch mandrel so as to lie side-by-side and cover a length of approximately nine inches. A layer of approximately 1/16 inch thick was built. The epoxy resin was applied to the roving as it was wound. Following this treatment, the cylinder was allowed to set for one hour at 100° F. Thereafter, it was soaked in the resin for approximately one hour at 125° F. and any excess resin removed. The cylinder was then cured for forty-five minutes at 240° F. and post cured for one hour upon being removed from the mandrel. Each cylinder was then cut to ½ inch lengths. The lengths were then tested under the following conditions:

(1) Dry;
(2) A twelve-hour boil in distilled water;
(3) 168-hour immersion at 190° F.; and
(4) Ten cycles per Military Specification MIL–E–5272C.

The tensile strengths of the NOL rings of the various binders, along with the retention of the properties samples, and percent resin content of the rings were recorded and are set forth below in Table VI.

In accordance with the practice of the above-described invention, various glass fiber-treating compositions may be formulated depending upon the particular point at which the composition is to be applied in the process of manufacturing glass fibers or reinforced plastics. Likewise, it has been demonstrated that the laminating or molding resins used to produce the plastic articles may also be modified as will further appear from the following description.

There can be used a mixture of phenols, e.g., a mixture of 0.12 part of m-phenol carboxylic acid and 0.12 part of salicyclic acid can be used in the formulation of Example 2 in place of 0.24 part of salicylic acid.

The amount of phenol carboxylic acid used per 100 parts of water can vary from 0.1 part up to 30 parts if the phenol carboxylic acid is sufficiently soluble. Preferably, 0.3 to 1.0 part of the phenol carboxylic acid is used.

The amount of water-soluble salt of a polyvalent metal and a strong acid used per 100 parts of water can also vary from 0.1 part up to 30 parts by weight. Preferred

TABLE VI

| Example No. | Tensile Strength Dry, p.s.i. | 12 hr. Boil | 190° F., 168 hr. Immersion | Cycled MIL-E-5272C | Percent Resin Content Avg. | Roving Tensile, #/End |
|---|---|---|---|---|---|---|
| 2 | 168.4 | 98.6 | 73.2 | 122.4 | 15.6 | 3.11 |
| Percent Retention | | 58.6 | 43.5 | 72.7 | | |
| 3 | 178.5 | 104.7 | 82.9 | 121.7 | 18.6 | 4.0 |
| Percent Retention | | 58.7 | 46.4 | 68.2 | | |
| 4 | 167.9 | 94.6 | 79.0 | 125.0 | 19.0 | 3.66 |
| Percent Retention | | 56.3 | 47.1 | 74.1 | | |
| 5 | 171.0 | 102.4 | 77.9 | 123.9 | 16.1 | 4.1 |
| Percent Retention | | 59.9 | 45.6 | 72.5 | | |
| 6 | 167.1 | 101.7 | 83.9 | 122.0 | 17.1 | 4.08 |
| Percent Retention | | 60.9 | 50.2 | 73.0 | | |
| 7 | 157.9 | 94.0 | 81.9 | 108.1 | 18.4 | 3.70 |
| Percent Retention | | 59.5 | 51.9 | 68.5 | | |
| 8 | 160.9 | 97.5 | 95.7 | 112.4 | 17.9 | 3.72 |
| Percent Retention | | 60.6 | 59.5 | 69.9 | | |
| 9 | 172.6 | 109.1 | 81.5 | 120.2 | 16.3 | 4.69 |
| Percent Retention | | 63.2 | 47.2 | 69.6 | | |
| 10 | 186.1 | 109.3 | 88.0 | 120.9 | 16.1 | 4.78 |
| Percent Retention | | 58.7 | 47.3 | 65.0 | | |
| 11 | 169.5 | 101.3 | 82.8 | 117.3 | | 4.85 |
| Percent Retention | | 59.8 | 48.8 | 64.2 | | |
| 12 | 185.4 | 103.1 | 74.9 | 120.8 | 18.3 | 4.67 |
| Percent Retention | | 55.6 | 40.4 | 65.2 | | |
| 13 | 177.7 | 108.6 | 79.7 | 126.4 | 17.5 | 4.52 |
| Percent Retention | | 61.1 | 44.9 | 71.7 | | |
| 14 | 175.9 | 97.1 | 83.9 | 127.1 | 17.0 | 4.58 |
| Percent Retention | | 55.2 | 47.7 | 72.3 | | |
| 15 | 181.9 | 111.4 | 72.3 | 126.9 | 17.1 | 4.82 |
| Percent Retention | | 61.2 | 39.7 | 69.8 | | |
| 16 | 170.2 | 98.7 | 79.6 | 103.7 | 19.2 | 4.34 |
| Percent Retention | | 59.0 | 46.8 | 60.9 | | |
| 17 | 195.2 | 111.3 | 79.9 | 121.0 | 18.6 | 4.10 |
| Percent Retention | | 57.0 | 40.9 | 62.0 | | |
| 18 | 191.6 | 101.9 | 59.8 | | 20.7 | 3.62 |
| Percent Retention | | 53.2 | 31.2 | | | | proportions of phenol carboxylic acid to the water-soluble salt are approximately 2/3 parts by weight.

If a size composition is desired embodying good performance, as well as good strength characteristics and further permitting elimination of many of the steps heretofore required in the manufacture of glass fibers—especially in the preparation of fibers for use as reinforcement in plastic materials, various chemical compositions should be added as they were above, to the composition of the instant invention to impart desirable characteristics.

The glass fiber size composition desirably includes a film-forming emulsified resinous polymer formed from ethylenically unsaturated monomers as disclosed in Steinman Patent 2,688,007, for example. Thus, there can be employed water emulsions of homo- and copolymers of acrylates and methacrylates, vinyl hydrocarbons, vinyl esters and vinylidene esters. Thus, there can be employed polymers of ethyl acrylate, methylacrylate, 2-ethylhexyl acrylate, methyl methacrylate, butyl methacrylate, styrene, p-chlorostyrene, alpha-methyl styrene, vinyl acetate, vinyl butyrate, vinyl chloride, vinylidene chloride, butadiene, styrene, isobutylene. Illustrative copolymers are vinylidene chloride-acrylonitrile (80:20), vinyl chloride-vinyl acetate (87:13), vinylidene chloride-vinyl chloride (60:40). These emulsions may be made by physically dispersing the respective monomers in water under controlled pH conditions and thereafter causing polymerization in the presence of suitable catalysts. The process of making the polymer resins is well known in the art, as shown, for example in an article by Mast and Fisher published at page 790 of volume 41 of "Industrial and Engineering Chemistry," and also in Houwink, "Elastomers and Polymers," volume 1, pages 58, 159, 167 to 174, published in 1950 by Elsevier Publishing Co., Inc.

The purpose of the film-forming polymer or polymers is to bind the fibers together substantially immediately after formation into a single strand and thus permit the fibers to be subsequently handled and processed as a single unit.

A lubricating agent should also be included in the size for the glass fibers. Particularly useful are the cationic type which is commonly used in the textile industry to improve softness and hand of textile fabrics, namely, condensation products (amides) of monobasic or dibasic fatty acids and polyethylene amines that have been solubilized with low molecular weight acids such as acetic, methacrylic, and acrylic acids. Other well-recognizable compatible glass lubricants may, likewise, be used, dependent upon the desired results.

The purpose of the lubricant is two-fold. The first function involves the need for a lubricating agent immediately after the fibers are first bound together because of the friction which occurs between the fibers themselves; the use of a lubricating agent substantially reduces this friction. Secondly, the lubricant functions as a wetting agent for the subsequently applied laminating or molding resin.

By way of still further improvement and invention, it was discovered that the bonding relationship between the plastic material and the reinforcing glass fibers and, additionally, the properties of the glass fibers in handling, winding, plying and weaving is improved by the modification of the size composition by the incorporation of a N-vinyl lactam such as polyvinyl pyrrolidone.

The polyester resins referred to herein are commonly known as low pressure resins, unsaturated polyester resins, or thermosetting resins of the addition polymerization type. They are commercially available under various trade names illustrated by the following:

(a) Selectron Resins manufactured by Pittsburgh Plate Glass Company.

(b) Paraplex Resins manufactured by Resinous Products Division, Rohm and Haas Company.

(c) Vibrin Resins manufactured by Naugatuck Chemical Division, U.S. Rubber Company.

(d) Laminac Resins manufactured by American Cyanamid Company.

Typical suitable polyester resins which can be used are described in U.S. Patents 2,195,362, 2,255,313 and 2,751,775. Thus, there can be used resins made from an unsaturated polyester and a polymerizable ethylenically unsaturated monomer. The polyester can be made from glycols such as ethylene glycol, diethylene glycol, propylene glycol, dipropylene glycol, 2,3-butanediol, 1,3-butanediol, tetrachlorobutanediol-1,4, trimethylene glycol and unsaturated dibasic acids (and their anhydrides if available) such as maleic acid, fumaric acid, hexachloroendomethylene tetrahydrophthalic acid, cis-3,6-endomethylene-delta 4-tetrahydrophthalic acid, itaconic acid and citraconic acid.

A portion of the unsaturated acid can be replaced by saturated aliphatic or aromatic polycarboxylic acids such as succinic acid, adipic acid, sebacic acid, azelaic acid, phthalic acid, tetrachlorophthalic acid, trimesic acid, hemimellitic acid and citric acid. As the ethylenically unsaturated monomer there can be used styrene, the vinyl toluenes, e.g., p-vinyl toluene, alpha-methyl styrene, triallyl cyanurate, diallyl phthalate, methyl methacrylate, ethylene glycol dimethacrylate, vinyl acetate, o-chlorostyrene. A specific example of a polyester is polyethylene glycol-polypropylene glycol-adipate-maleate modified with styrene. There can be used epoxy resins, more especially epoxy resins having more than one vic-epoxy group. Suitable epoxy resins include the reaction products of polyhydric alcohols or polyhydric phenols with epichlorhydrin or glycerol chlorhydrin. Examples of such resins are the polyglycidyl ethers of resorcinol, catechol, hydroquinone, bis-(4-hydroxyphenyl)-2,2-propane (bis-phenol A), 4,4'-dihydroxy-benzophenone, bis-(4-hydroxyphenyl)-1,1-ethane, tetrakis (4-hydroxyphenyl) ethane, bis-(4-hyroxyphenyl)-1,1-isobutane, bis-(4-hydroxyphenyl)-2,2-butane, bis(4-hydroxy-2-methylphenyl)-2,2-propane, bis-(4-hydroxy-2-t-butyl-phenyl)-2,2-propane, bis-(2-hydroxynaphthyl)-methane, 1,5-dihydroxynaphthalene, ethylene glycol, propylene glycol, trimethylene glycol, diethylene glycol, triethylene glycol, glycerol, dipropylene glycol, diglycerol, erythritol, mannitol, sorbitol, polyallyl alcohol, polyvinyl alcohol, novolak resins, e.g., the novolak from 4 mols of phenol and 3 mols of formaldehyde, as well as other novolaks having 3 to 7 phenolic nuclei, phloroglucinol, 2, 4,4'-trihydroxy diphenyl dimethyl methane, 4,4'-dihydroxy diphenyl sulfone, 4,4'-dihydroxy biphenyl. Other suitable epoxy resins include polymers of butadiene dioxide, diglycidyl ether, allyl glycidyl ether, glycidyl methacrylate, the glycidyl ester of trimerized linoleic acid or the diglycidyl ester of dimerized linoleic acid, Oxiron 2000 (an epoxidized polybutadiene partially hydrolyzed vinyl acetate copolymer having a viscosity of 1800 poise, an epoxy equivalent of 177, having 2.5% hydroxyl and an iodine number of 185). Oxiron 2000 is described more fully in Data for Industry of the Food Machinery and Chemical Corporation No. 1, January 1960.

The preferred epoxy resins are bisphenol A-epichlorhydrin condensation products which contain both hydroxyl groups and epoxide groups. The epoxy resins can be combined with other polyfunctional materials such as thermosetting resins, e.g., phenol-formaldehyde, melamine-formaldehyde, cresol-formaldehyde, urea-formaldehyde or curing agents such as amines, e.g., diethylenetriamine, m-phenylene diamine, acid anhydrides, e.g., maleic anhydride and phthalic anhydride, polybasic acids, e.g., dibasic acids such as oxalic acid or tribasic acids, such as citric acid, etc. Such combinations permit the formation of cured resin.

The silane composition which may be added to the laminating or molding plastic to enhance still further the beneficial strength characteristics of the reinforced plastic is preferably vinyl triethoxy silane. While many organosilicons containing a double bond in the organic portion of the molecule might be useful in the practice of this invention, we have found the above silane to be particularly suitable. Others which may be advantageously employed to give various degrees of results include dimethoxy vinyl silane, monomethoxy, vinyl silane, dimethoxy allyl silane, triethoxy allyl silane and diallyl methyl ethoxy silane. It is to be understood that aryloxy and halo radical-containing silanes, as previously set forth, are also useful as are saturated organic radical-containing silanes, e.g., ethyl triethoxy silane.

It is to be noted that the weight percentage of the silane is preferably 1.5 of the thermosetting resin composition. However, it may vary between 0.2 and 3.5% or higher, depending on the results desired.

The glass fibers coated wtih treating compositions employing features of this invention can be incorporated in the form of roving, yarn, fabric and the like, and may vary in amounts between 1 and 35% by weight or more in the laminate or other plastic article.

While the foregoing provides a complete description of the invention in such manner as to distinguish it from other inventions and from what is old, and provides a description of the best mode contemplated of carrying out the invention, it is to be understood that variations and modifications of the invention, as illustrated by specific examples herein, may be made without departing from the spirit of the invention, which is not to be limited to the specific embodiments thereof described, but is defined in the appended claims.

What we claim is:

1. A method of improving the receptivity of glass fibers for resinous materials which comprises contacting the glass fibers with a coupling agent in acidic aqueous medium, the coupling agent consisting essentially of, per 100 parts by weight of water, (1) approximately 0.1 to 30 parts by weight of a water-soluble carboxyl substituted phenol and (2) approximately 0.1 to 30 parts by weight of a water-soluble salt of a polyvalent metal and a strong acid, said metal being one which forms a weak base.

2. A method according to claim 1 wherein the polyvalent metal salt is a salt of an element of Group VIII$^b$ of the periodic system.

3. A method according to claim 1 wherein the polyvalent metal salt is an iron salt.

4. A method according to claim 1 wherein there is also included in the aqueous composition a member of the group consisting of thermosetting epoxy resins and thermosetting ethylenically unsaturated polyester resins.

5. A method according to claim 1 wherein the phenol is salicylic acid in an amount between 0.1 part per 100 parts of water by weight and the solubility limit of salicylic acid in the acidic aqueous medium and the metal salt is an iron salt and is used in an amount of between 0.1 and 30 parts per 100 parts of water by weight.

6. A method according to claim 1 wherein there is incorporated in the acidic aqueous composition a silane having the formula $$R_1SiX_{4-n}$$

where $R_1$ is selected from the group consisting of

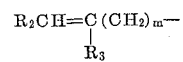

lower alkylamino and lower alkoxyglycidyl, $R_2$ and $R_3$ are selected from the group consisting of hydrogen, halogen, alkyl and aryl radicals, X is a radical selected from the group consisting of halogen, alkoxy and aryloxy, $n$ is an integer from 1 to 3 and $m$ is an integer from 0 to 1.

7. A product prepared by the method of claim 1.

8. A method according to claim 1 wherein the polyvalent metal salt is a salt of a metal selected from the group consisting of iron, cobalt, aluminum and chromium.

9. A method according to claim 1 wherein the phenol carboxylic acid is monohydroxy monocarboxyl benzene.

10. In a method of sizing glass fibers, the improvement comprising the step of contacting the glass fibers with a coupling agent, in an acidic aqueous emulsion, the coupling agent consisting essentially of, per 100 parts by weight of water, (1) approximately 0.1 to 30 parts by weight of a water-soluble carboxyl substituted phenol and (2) approximately 0.1 to 30 parts by weight of a water-soluble salt of a polyvalent metal and a strong acid, said metal being one which forms a weak base, said emulsion also containing (3) a film-forming polymer of an ethylenically unsaturated monomer.

11. A method according to claim 10 wherein the composition includes a member of the group consisting of thermosetting epoxy resins and thermosetting ethylenically unsaturated polyester resins.

12. A method according to claim 11 wherein the composition includes polyvinylpyrrolidone.

13. A method according to claim 10 wherein the composition includes a glass lubricating agent selected from the group consisting of amides made by condensation of a member of the group consisting of monobasic fatty acids and dibasic fatty acids with a polyethylene polyamine.

14. A method according to claim 10 wherein there is included in the composition vinyl triethoxy silane.

15. A method of treating a glass fiber comprising contacting the glass fiber with a coupling agent in an acidic aqueous mixture, the coupling agent consisting essentially of, per 100 parts by weight of water, (1) approximately 0.1 to 30 parts by weight of salicylic acid and (2) approximately 0.1 to 30 parts by weight of a water-soluble iron salt of a strong inorganic acid, said mixture also containing (3) a thermosetting bisphenol A-epichlorhydrin resin.

16. A method of treating a glass fiber comprising contacting the glass fiber with a coupling agent in an acidic aqueous mixture, the coupling agent consisting essentially of, per 100 parts by weight of water, (1) approximately 0.2 part by weight of salicylic acid and (2) approximately 0.3 part by weight of a water-soluble iron salt selected from the group consisting of iron chlorides, iron bromides and iron sulfates, said mixture also containing (3) a thermosetting bisphenol A-epichlorhydrin resin.

References Cited

UNITED STATES PATENTS 2,932,598   4/1960   Henning _____ 117—126

ALFRED L. LEAVITT, *Primary Examiner.*

W. L. SOFFIAN, *Examiner.*

UNITED STATES PATENT OFFICE
CERTIFICATE OF CORRECTION

Patent No. 3,326,716                      June 20, 1967

Elmer B. Hurley et al.

It is hereby certified that error appears in the above numbered patent requiring correction and that the said Letters Patent should read as corrected below.

Column 4, line 74, for "IV$^b$" read -- IVb --; column 5, line 9, for "groups" read -- group --; column 6, lines 35 to 38, the formula should appear as shown below instead of as in the patent:

line 43, for "alkyloxyalkylene" read -- alkyloxyalkaylene --; columns 7 and 8, TABLE I, under the heading "EPON-820+20% Z", tenth column, line 1 thereof, for "45.6" read -- 85.6 --; same table, under the heading "EPON-815+20% Z", eighth column, line 6 thereof, for "56,360" read -- 46,360 --; same table, same heading, ninth column, line 7 thereof, for "45,504" read -- 46,504 --; column 15, line 64, for "monomethoxy," read -- monomethoxy --.

Signed and sealed this 25th day of June 1968.

(SEAL)
Attest:

EDWARD M. FLETCHER, JR.            EDWARD J. BRENNER
Attesting Officer                 Commissioner of Patents